(No Model.)
J. KOPFLER.
COTTON GIN ATTACHMENT.
No. 251,249. Patented Dec. 20, 1881.
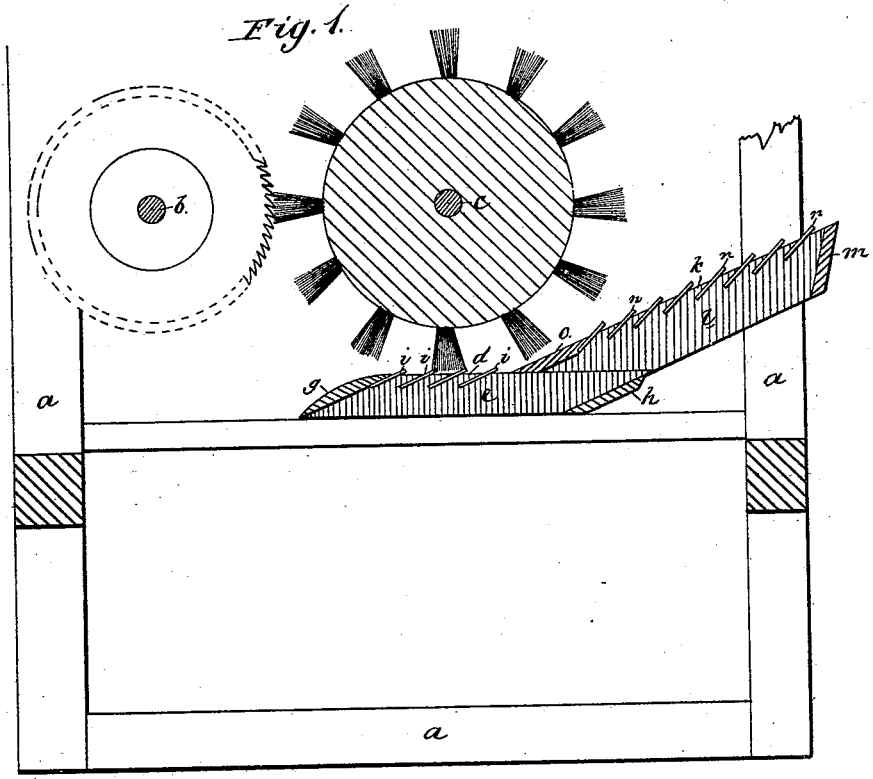
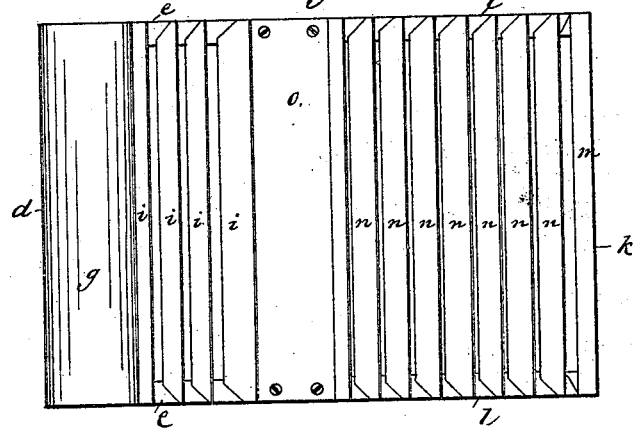
WITNESSES:
W. W. Hollingsworth
W. Ready
INVENTOR:
Joseph Kopfler
BY
ATTORNEYS.

UNITED STATES PATENT OFFICE.

JOSEPH KOPFLER, OF AMITE CITY, LOUISIANA.

COTTON-GIN ATTACHMENT.

SPECIFICATION forming part of Letters Patent No. 251,249, dated December 20, 1881.

Application filed October 18, 1881. (No model.)

*To all whom it may concern:*

Be it known that I, JOSEPH KOPFLER, of Amite City, Tangipahoa parish, and State of Louisiana, have invented a new and useful Improvement in Cotton-Gin Attachments; and I do hereby declare that the following is a full, clear, and exact description of the same, reference being had to the accompanying drawings, forming part of this specification, in which—

Figure 1 is a vertical longitudinal section of my improved cotton-gin attachment. Fig. 2 is a plan view of the same.

My invention relates to improvements in attachments to cotton-gins to remove motes, sand, &c., from the cotton while being ginned; and it consists in the peculiar construction and arrangement of the parts, as hereinafter more fully set forth.

In the accompanying drawings, $a$ represents the frame of my improved cotton-gin, in which is journaled the saw-shaft $b$ and the shaft $c$ of the brush-cylinder, all of the usual construction.

$d$ represents a frame, the side pieces $e$ of which are beveled at their ends and secured together by the transverse bars $g$ $h$.

$i$ $i$ represent a horizontal series of inclined slats inserted in opposite parallel grooves in the upper faces of the side pieces $e$ of the frame $d$. When the frame $d$ is in position the slats $i$ are inclined and parallel with each other, with spaces between them for the escape of motes and dirt from the cotton while being ginned.

$k$ represents a second frame, the side pieces $l$ of which are beveled at their ends, the rear beveled ends of the side pieces $l$ being secured together by the transverse bar $m$.

$n$ $n$ represent a series of parallel slats inserted in opposite parallel grooves in the upper faces of the side pieces $l$ of the frame $k$. The slats $n$ are inclined upwardly from the upper faces of the side pieces $l$ and are provided with spaces between them. The forward beveled ends of the side pieces $l$ are secured to the upper faces of the side pieces $e$ of the frame $d$.

$o$ represents a transverse bar or board connecting the side pieces, $e$ $l$, of the frames $d$ $k$ at their junction.

By this construction it will be seen that the upper faces of the slatted frames $d$ $k$ form an obtuse angle with each other, and that the slats of one frame form a different angle with their frame from that formed by the slats of the other frame with their frame. The slatted frames $d$ $k$, thus secured together, form in effect a single angular frame, the side pieces, $e$ $l$, of which are secured to the inner faces of the frame $a$ of the cotton-gin immediately in rear of the gin-saw and under the brush-cylinder, the slatted frame $k$ forming the bottom of the flue at its forward end. By reason of the inclination of the slats air-eddies will be formed immediately in rear of each slat when the brush-cylinder is revolved, which eddies will carry off the motes and dirt from the cotton passing over the slats and into the flue.

I claim as my invention—

In a cotton-gin, the combination, with the brush cylinder, of the frames $d$ $k$, secured together and provided with the horizontal series of slats $i$ and upwardly-inclined series of slats $n$, substantially as described, and for the purpose set forth.

JOSEPH KOPFLER.

Witnesses:
G. M. BATTEY,
M. F. MCLAURIN.